2,900,379
COPPERABLE DISAZO DYESTUFFS

Klaus Böckmann, Koln-Stammheim, and Carl Taube, Leverkusen-Bayerwerk, Germany, assignors to Farbenfabriken Bayer Aktiengesellschaft, Leverkusen, Germany, a corporation of Germany No Drawing. Application June 25, 1957
Serial No. 667,960

Claims priority, application Germany August 16, 1956

3 Claims. (Cl. 260—161)

The present invention relates to new copperable disazo dyestuffs; more particularly it relates to disazo dyestuffs corresponding to the formula

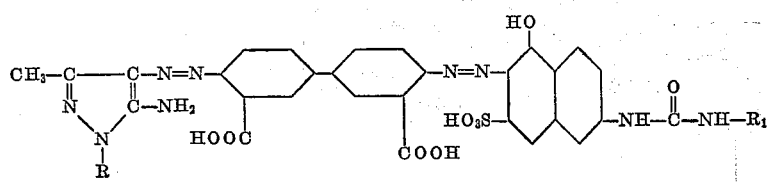

wherein R and $R_1$ stand for aryl radicals.

The new disazo dyestuffs are obtainable by coupling 1 mol of tetrazotized 4,4'-diamino diphenyl-3,3'-dicarboxylic acid with 1 mol of an 1-aryl-3-methyl-5-amino-pyrazol and 1 mol of an aryl urea of the 2-amino-5-hydroxynaphthalene-7-sulfonic acid.

The urea derivatives of the 2-amino-5-hydroxynaphthalene-7-sulfonic acid may be prepared, for instance, by treating a solution of 2-amino-5-hydroxynaphthalene-7-sulfonic acid and a suitable arylamine, for example 1-acetylamino-4-aminobenzene or 2-aminonaphthalene-8-sulfonic acid, with phosgene. Further arylamines suitable for the urea formation with 2-amino-5-hydroxynaphthalene-7-sulfonic acid are, for example, aminobenzene, aminobenzene carboxylic acids, 2-aminonaphthalene-3-, or -4-sulfonic acid or 2-aminonaphthalene-6-carboxylic acid.

The urea-group containing coupling compounds can also be obtained by reacting an urethane of the 2-amino-5-hydroxynaphthalene-7-sulfonic acid with an arylamine according to the process described in German Patent 871,000.

As 1-aryl-3-methyl-5-amino-pyrazols there may be mentioned, for example, 1-(8'-, 7'-, 6'-, 5'- or 4'-monosulfonaphthyl-[2'])-3-methyl-5-aminopyrazol, 1-(6'- or 4'-carboxynaphthyl-[2']) - 3 - methyl - 5 - aminopyrazol, 1-phenyl-3-methyl-5-aminopyrazol, 1-(3'- or 4-'chlorophenyl)-3-methyl-5-aminopyrazol, 1-(3'- or 4'-nitrophenyl)-3-methyl-5-aminopyrazol, 1-(3'- or 4'-alkyl or -alkoxyphenyl)-3-methyl-5-aminopyrazol, 1-(3'- or 4'-aminophenyl or - acetylaminophenyl) - 3 - methyl - 5-aminopyrazol, or 1-(3'- or 4'-sulfo- or -sulfamidophenyl)-3-methyl-5-aminopyrazol.

The new disazo dyestuffs dye cotton and regenerated cellulose in reddish violet shades which become very fast to light and to washing by after-treatment with copper-yielding agents.

The following examples are given for the purpose of illustrating the invention without, however, limiting it thereto:

Example 1

27.2 grams of 4,4'-diaminodiphenyl-3,3'-dicarboxylic acid are tetrazotized in usual manner in 500 millilitres of water. Into this solution there are introduced 17.3 grams of 1-phenyl-3-methyl-5-aminopyrazol dissolved with hydrochloric acid in 200 millilitres of water. The solution is rendered to a pH of 4.5 by adding sodium acetate and stirred overnight. The separated diazo monoazo compound is filtered and poured into a soda-alkaline solution of 48.8 grams of the urea obtained by phosgenation of 2-amino-5-hydroxynaphthalene-7-sulfonic acid and 2-aminonaphthalene-8-sulfonic acid in 500 millilitres of water. When the coupling is completed, the disazo dyestuff is isolated and dried. It corresponds to the formula

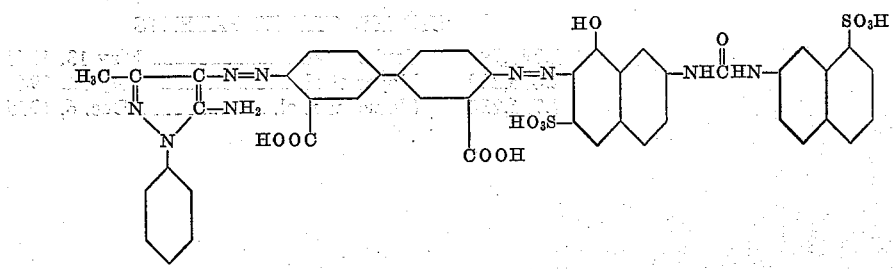

and represents a water-soluble dark powder which dyes cotton and regenerated cellulose in reddish violet shades. The dyeing becomes very fast to light and to washing by after-treatment with copper-yielding agents.

Example 2

The diazo monoazo compound prepared according to the method described in Example 1 from 27.2 grams of tetrazotized 4,4'-diaminodiphenyl-3,3'-dicarboxylic acid and 17.3 grams of 1-phenyl-3-methyl-5-aminopyrazol is coupled in a soda-alkaline medium with 41.5 grams of the urea prepared by phosgenation of 2-amino-5-hydroxy-naphthalene-7-sulfonic acid and 1-acetylamino-4-amino-benzene. The disazo dyestuff thus obtained is, after drying, a water-soluble dark-brown powder which dyes cotton and regenerated cellulose in red violet shades. The dyeing becomes very fast to light and to washing by after-treatment with copper-yielding agents.

*Example 3*

27.2 grams of tetrazotized 4,4'-diaminodiphenyl-3,3'-dicarboxylic acid are combined with 30.3 grams of 1-(8'-sulfonaphthyl-[2'])-3-methyl-5-aminopyrazol. The diazo monoazo compound thus obtained is coupled with 41.5 grams of the urea which was obtained by phosgenation of 2-amino-5-hydroxy-naphthalene-7-sulfonic acid and 1-acetylamino-4-aminobenzene. The isolated dyestuff represents a dark powder which is soluble in water. It dyes cotton and regenerated cellulose in red violet shades which become very fast to light by after-coppering.

*Example 4*

0.2 grams of the dyestuff obtained according to Example 1 are dissolved in 200 ml. of hot water with the addition of 1 gram of soda. In this solution there are introduced 10 grams of a cotton fabric. The bath is heated to 95° C. and maintained at this temperature with stirring for 1 hour while adding in portions 2 grams of a 10 percent sodium sulfate solution. After rinsing with water the dyed material is after-treated at 80–90° C. within 20 to 30 minutes in a bath containing 0.3 grams of crystalline copper sulfate and 0.1 gram of acetic acid in 200 ml. of water, whereby the reddish violet dyeing becomes very fast to light and to washing.

We claim:

1. A copperable disazo dyestuff corresponding to the formula

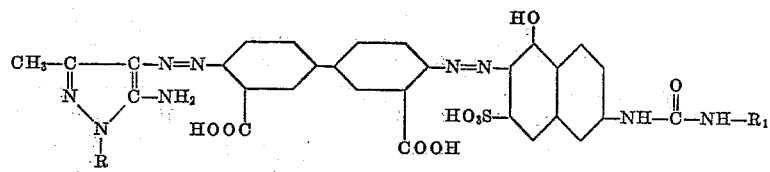

wherein R and $R_1$ each stand for an aryl radical selected from the group consisting of the benzene and naphthalene series.

2. The disazo dyestuff corresponding to the formula

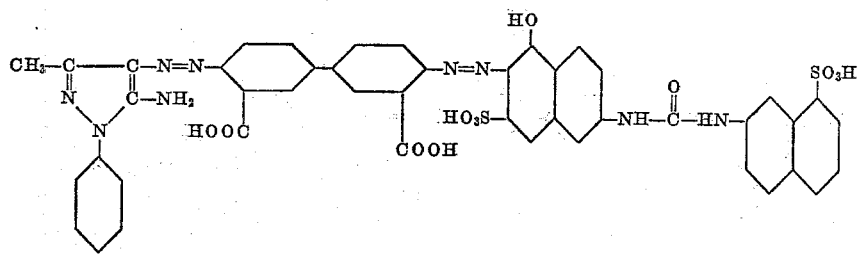

3. The disazo dyestuff corresponding to the formula

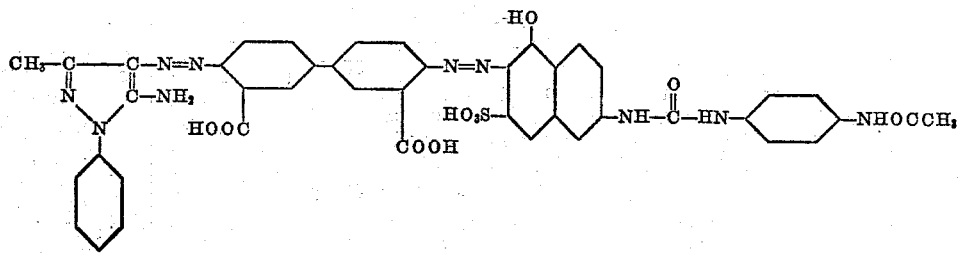

References Cited in the file of this patent
UNITED STATES PATENTS

| | | |
|---|---|---|
| 2,241,796 | Taube et al. | May 13, 1941 |
| 2,476,259 | Mayer et al. | July 12, 1949 |
| 2,726,238 | Morschel et al. | Dec. 6, 1955 |